(12) United States Patent
Shchukin et al.

(10) Patent No.: US 9,835,088 B2
(45) Date of Patent: Dec. 5, 2017

(54) COOLED WALL

(71) Applicant: ALSTOM Technology Ltd, Baden (CH)

(72) Inventors: Sergey Shchukin, Mellingen (CH); Robert Marmilic, Rieden (CH)

(73) Assignee: ANSALDO ENERGIA SWITZERLAND AG, Baden (CH)

( * ) Notice: Subject to any disclaimer, the term of this patent is extended or adjusted under 35 U.S.C. 154(b) by 588 days.

(21) Appl. No.: 14/491,040

(22) Filed: Sep. 19, 2014

(65) Prior Publication Data
US 2015/0003975 A1    Jan. 1, 2015

Related U.S. Application Data

(63) Continuation of application No. PCT/EP2013/055985, filed on Mar. 21, 2013.

(30) Foreign Application Priority Data

Mar. 22, 2012    (EP) .................... 12160876

(51) Int. Cl.
F01D 5/18 (2006.01)
F01D 25/12 (2006.01)
F02C 7/12 (2006.01)

(52) U.S. Cl.
CPC .............. *F02C 7/12* (2013.01); *F01D 5/18* (2013.01); *F01D 5/187* (2013.01); *F01D 25/12* (2013.01);
(Continued)

(58) Field of Classification Search
CPC ... F01D 5/18; F01D 5/187; F02C 7/12; F05D 2240/127; F05D 2260/2212;
(Continued)

(56) References Cited

U.S. PATENT DOCUMENTS 4,660,630 A * 4/1987 Cunningham ........ B21C 37/207
                                                        165/133
5,353,865 A * 10/1994 Adiutori ................. F28F 13/02
                                                        165/109.1
(Continued)

FOREIGN PATENT DOCUMENTS

CN    1405431 A    3/2003
JP    H10274001 A    10/1998
(Continued)

OTHER PUBLICATIONS

Office Action (Notice of Reasons for Refusal) dated Feb. 6, 2017, by the Japanese Patent Office in Japanese Patent Application No. 2015-500938, and an English Translation of the Office Action. (11 pages).

(Continued)

Primary Examiner — Christopher Verdier
Assistant Examiner — Christopher R Legendre
(74) Attorney, Agent, or Firm — Buchanan Ingersoll & Rooney PC

(57) ABSTRACT

The disclosure pertains to a cooled wall for separating a hot gas flow path of a gas turbine from a cooling flow including at least one turbulator rib extending from the wall into the cooling flow, and having a height, a width for providing heat transfer enhancement for the cooled wall. The turbulator rib has filets at its root with a filet radius. In order to increase the heat transfer enhancement of the turbulator rib, the filet at the downstream side of turbulator rib is extending into the cooled wall with a penetration depth. Further, the disclosure relates to specific embodiments in which the cooled wall with turbulator ribs is configured as the sidewall of an airfoil, a combustor wall or a heat shield.

12 Claims, 3 Drawing Sheets

(52) U.S. Cl.
CPC .............. *F05D 2240/127* (2013.01); *F05D 2260/2212* (2013.01); *F05D 2260/22141* (2013.01)

(58) Field of Classification Search
CPC ...... F05D 2260/22141; F05B 2240/122; F05B 2260/222; F05B 2260/2241
See application file for complete search history.

(56) References Cited

U.S. PATENT DOCUMENTS

| | | | |
|---|---|---|---|
| 5,738,493 A | 4/1998 | Lee et al. | |
| 6,067,712 A * | 5/2000 | Randlett | F28F 1/26 165/109.1 |
| 6,142,734 A | 11/2000 | Lee | |
| 6,439,846 B1 * | 8/2002 | Anderson | F01D 5/187 416/96 A |
| 6,612,808 B2 * | 9/2003 | Lee | F01D 5/187 415/175 |
| 6,769,875 B2 * | 8/2004 | Tiemann | F01D 5/189 416/233 |
| 8,402,764 B1 * | 3/2013 | Liang | F01D 9/023 60/755 |
| 2001/0008070 A1 * | 7/2001 | Dailey | F01D 5/187 60/722 |
| 2003/0049127 A1 | 3/2003 | Tiemann | |
| 2010/0226761 A1 | 9/2010 | Liang | |
| 2010/0226791 A1 | 9/2010 | Fujimira et al. | |
| 2011/0033312 A1 | 2/2011 | Lee et al. | |
| 2013/0047618 A1 * | 2/2013 | Gregory | F23R 3/002 60/722 |
| 2015/0003975 A1 * | 1/2015 | Shchukin | F01D 5/18 415/178 |

FOREIGN PATENT DOCUMENTS

| | | |
|---|---|---|
| RU | 87 748 U1 | 10/2009 |
| SU | 364747 A1 | 12/1972 |

OTHER PUBLICATIONS

Office Action dated Mar. 21, 2017, by the Russian Patent Office in corresponding Russian Patent Application No. 2014142552/06(068753). (5 pages).

* cited by examiner

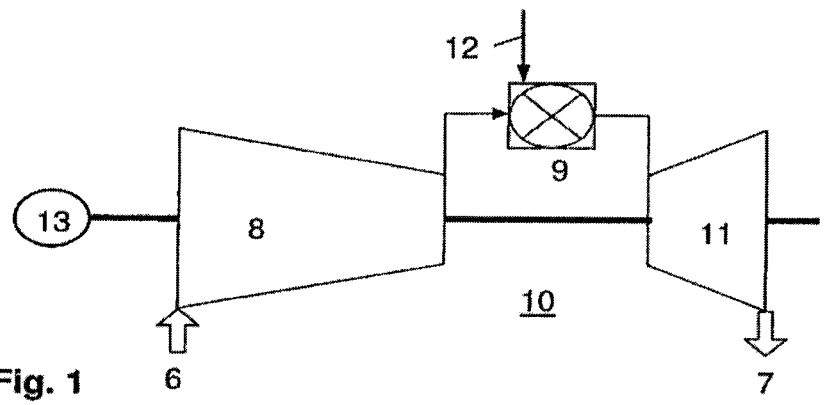
Fig. 1 Prior Art
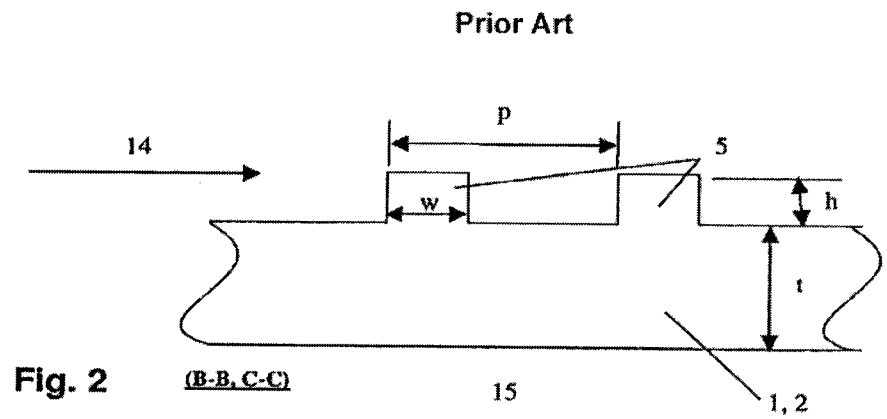
Fig. 2 (B-B, C-C) Prior Art
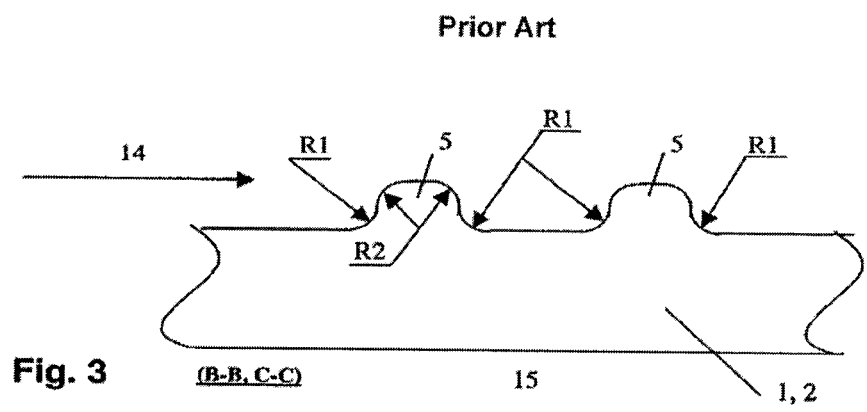
Fig. 3 (B-B, C-C) Prior Art

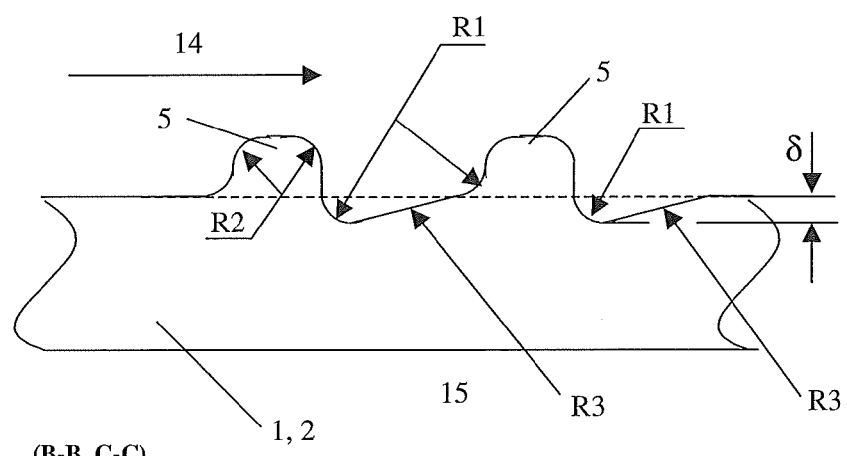
Fig. 4 (B-B, C-C)
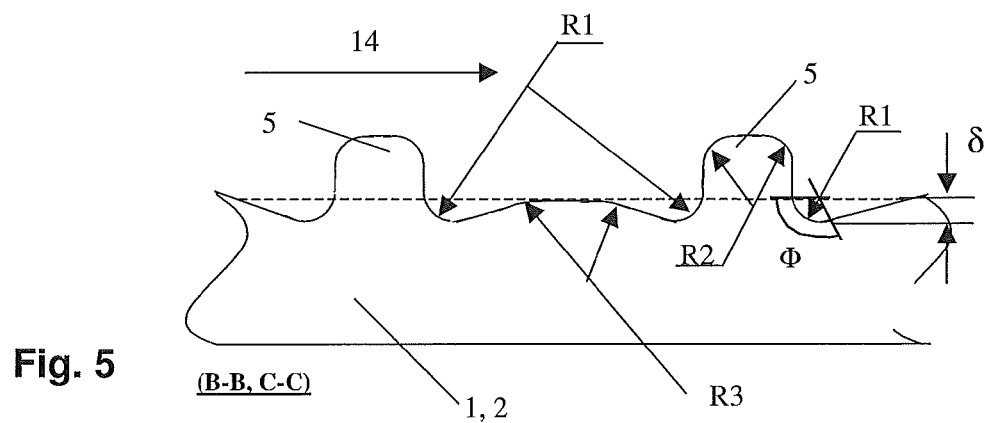
Fig. 5 (B-B, C-C)

A – A

COOLED WALL

CROSS-REFERENCE TO RELATED APPLICATIONS

This application claims priority to PCT/EP2013/055985 filed Mar. 21, 2013, which claims priority to European application 12160876.4 filed Mar. 22, 2012, both of which are hereby incorporated in their entireties.

TECHNICAL FIELD

The disclosure relates to a cooled wall with turbulators for enhanced heat transfer.

BACKGROUND

In a conventional gas turbine; a compressor pressurizes air, which is channeled to a combustor, mixed with fuel, and ignited for generating combustion gases which flow to a turbine disposed downstream therefrom. The turbine extracts energy from the hot combustion gases for driving the compressor and a generator.

Conventional turbines include one or more stages of stationary vanes and rotating blades, which typically extract energy from the combustion gases by reaction. The combustor, blades and vanes are typically air cooled by a portion of the air pressurized by the compressor in order to provide acceptable life in the gas turbine engine. However, any portion of the compressed air that is utilized for cooling the hot gas path parts (combustor, blades, vanes etc.) is not available for undergoing combustion, which reduces the overall efficiency and power of the engine. Accordingly, it is desirable to use as little of the compressed air as possible in cooling the hot gas path parts, in particular the blades and vanes, consistent with obtaining relatively long useful life of the hot gas parts, which is typically accomplished by providing heat transfer enhancement members such as elongate turbulator ribs on the cooling side of the hot gas path parts.

Gas turbine engine hot gas path parts such as for example an airfoil portion over which the combustion gases flow typically comprises cooled sidewalls with an internal passage for channeling the cooling air. The term hot gas path part used herein shall mean any member placed within the gas turbine engine flowpath over which the hot combustion gases flow, such as burner walls, combustor walls or liners as well as rotor blades or stator vanes. Rotor blades or stator vanes are simply referred to as blades in the following description.

Turbulator ribs typically used in cooled airfoils are conventionally formed as part of the blade casting and project inwardly into the internal cooling passages of the blade through which the cooling air is channeled. The ribs enhance the convective heat transfer coefficient along the inner surface of the blade by tripping or disrupting the cooling air boundary layer, which is caused to separate from the internal surface and then reattach downstream from the rib. The heat transfer coefficient enhancement is conventionally defined as the convective heat transfer coefficient effected by the ribs divided by the convective heat transfer coefficient over a smooth surface without turbulator ribs, and has values ranging up to several times that of the latter. Typically also the ribs of other hot gas path parts are integrally formed as part of the part, e.g. during casting.

Enhancement is conventionally related to the height or projection of the ribs into the internal passage, the distance between opposing walls of the internal passage, and the distance or spacing longitudinally between the ribs. Exemplary turbulator ribs may include ribs disposed perpendicularly to the direction of cooling flow, ribs inclined relative to the direction of the cooling airflow, and ribs disposed on opposite walls of the internal passage that are longitudinally positioned either in-line or staggered with respect to each other.

Turbulator ribs provide localized increases in enhancement, which decrease rapidly in value downstream from each individual rib. For obtaining a generally uniform cooling enhancement along the surface of the wall cooled the ribs are typically uniform in configuration, uniform in height or projection into the internal passage, and uniform in longitudinal spacing.

The various conventional turbulator ribs result in different amounts of enhancement, along with pressure losses associated therewith. Since the ribs project into the internal passage and partially obstruct the free flow of the cooling air therethrough, they provide resistance to the flow of the cooling air, which results in pressure losses. Although higher ribs generally increase enhancement, the pressure drop associated therewith also increases. Accordingly, the effectiveness of turbulator ribs must be evaluated by their ability to provide effective enhancement without undesirable levels of pressure losses associated therewith.

A cut of cooled wall 1, 2 with an ideal conventional turbulator rib for cooling enhancement is shown in FIG. 2. The cooled wall 1, 2 has a wall thickness t. It has a smooth surface on the hot side 15 and turbulator ribs 5 having a height h and a width w extend into the cooling flow 14. The ideal turbulator ribs have acute corners at their tips and roots for good heat transfer enhancement. They are spaced apart with a pitch p.

Even so the ideal turbulator rib of FIG. 2 leads to a good heat transfer enhancement their shape can typically not be realized for practical reasons. Manufacturing of acute angles typically requires machining. However, most of the hot gas parts of a gas turbine are cast, and therefore require minimum radii. Further, hot gas parts are typically coated. Coating material tends to smoothen sharp corners and increase the radius of any curved shape. In reality a cooled wall 1, 2 with turbulator ribs 5 deviates from the ideal shape shown in FIG. 2, and its turbulator ribs 5 have rounded corners. FIG. 3 shows a cut of a cooled wall 1, 2 with realistic conventional turbulator ribs 1, 2 for cooling enhancement. The roots of the turbulators 5 are formed with fillets having a radius R1, and the tips are rounded with a radius R2.

SUMMARY

One aspect of the present disclosure is to propose cooled wall for a gas turbine separating a hot gas flow path from a cooling flow passage, which at least partly compensates for the losses in cooling efficiency of turbulator ribs due to a rounded tip contour and fillets at the root of turbulator ribs. Further, such cooled wall forming the sidewall of an airfoil, a heat shield, burner or a combustion chamber are objectives of the disclosure. Additional configurations of the disclosure follow from the dependent claims.

Such a cooled wall for separating a hot gas flow in a gas turbine from a cooling flow passage comprises at least one turbulator rib extending from the wall into the cooling passage. The turbulator rib further has fillets at the root of the turbulator rib with a fillet radius and typically rounded corners at the tip with a tip radius. According to a first embodiment the fillet at least one side of the turbulator rib is extending into the cooled wall. The fillet typically has a radius and is forming an indentation in the cooled wall. The fillet or indentation leads to a local reduction of the wall thickness adjacent to a rib. The fillet forms a smooth, transition from a side of the rib to the cooled wall, where the side of the rib is typically vertical to the cooled wall. The fillet can have the form of an arc. The central angle of this arc is greater than 90°. Typically the arc is a circular arc. One end of the arc is tangential to the side of the rib. The other end of the arc is inclined with an angle, which is pointing away from the hot side of the side wall.

The proposed local wall thickness reduction with a fillet forming smooth arc adjacent to a rib allow to keep blade integrity and, at the same case, will not lead to noticeable pressure loss increase. The turbulator rib height can be chosen at an optimum manufacturing process (casting, coating) deficiencies can be avoided. According to one embodiment the local wall thickness reduction due to the fillet extends up to 50% of the pitch between two adjacent ribs. According to another embodiment the local wall thickness reduction due to the fillet extends up to 20% of the pitch between two adjacent ribs.

The fillet is extending into the cooled wall with a penetration depth for further heat transfer enhancement.

During operation a cooling flow flows through the cooling flow passage. According to an embodiment the fillet at the downstream side of the turbulator rib relative to the cooling flow during operation is extending into the cooled wall.

Typically the cooling flow flows with a main direction, which is parallel to the surface of the cooled wall.

According to a further embodiment the transition between the fillet, which is extending into the cooled wall, and the onset of a subsequent turbulator rib of the cooled wall is linear.

In an alternative embodiment the transition between the fillet, which is extending into the sidewall, and the onset of a subsequent turbulator rib is curved with a curvature, which is smaller than the curvature of the fillet.

Additionally, a fillet extending into the cooled wall at the upstream side of the turbulator rib can be provided for further heat transfer enhancement. Accordingly, on both sides of the turbulator rib there can be provided a fillet extending into the side wall.

The fillet at the upstream side extends into the cooled wall with a penetration depth.

The penetration depth at both sides of the fillet can be the same according to one embodiment.

A cooled wall with a fillet, which is extending into the sidewall, upstream and downstream of the turbulator rib, has a transition area between the fillets, which are extending into the sidewall, and the neighboring wall section, which has the full wall thickness. According to one embodiment this transition is linear. According to an alternative embodiment this transition is curved with a curvature, which is smaller than curvature of the fillets.

Besides enhancing the turbulence induced by the turbulator rib, the fillet extending into the sidewall also increases the effective surface for heat transfer. Thus the fillet increases the heat transfer coefficient and the effective heat transfer area.

In order to compensate for the negative effect of the rounded tip and the fillet at the root of the turbulator rib the fillet needs a minimum penetration depth into the cooled wall. However, a deep penetration reduces the mechanical strength of the wall, thereby limiting the penetration depth. According to one embodiment the penetration of the fillet into the cooled wall is between 0.5 and 1.5 times the fillet radius. In a further embodiment the penetration depth is smaller than the fillet radius.

According to yet another embodiment the penetration depth is related to the thickness of the cooled wall directly. Here, the penetration depth is limited to ¼ of the wall thickness (t). In a more specific embodiment the penetration depth is limited to a range between 2% and 20% of the cooled wall thickness.

The interaction of the fillet extending into the cooled wall with the turbulator rib depends on the turbulator tip width, its height and the pitch between subsequent turbulator ribs. In order to show noticeable positive effect the ratio of turbulator tip width to pitch between subsequent turbulator ribs should not become too big. Further, a minimum distance between turbulators is required. Preferably the turbulator tip width is 5% to 20% of the pitch between two subsequent turbulator ribs.

In one embodiment the cooled wall is configured as a cooled wall of a cooling assembly separating a cooling flow passage from a hot gas flow path. The fillets extending into the cooling flow passage best enhance the turbulator rib's effect if the turbulator rib height is between 5% and 20% of the height of the adjoining cooling flow passage.

According to one embodiment the turbulator ribs are an integral part of the cooled wall. Typically the sidewall and the turbulator ribs are cast in one part.

Besides the cooled wall itself, specific applications of the cooled wall are an objective of the disclosure.

In a specific embodiment the cooled wall with turbulator ribs is configured as the sidewall of an airfoil. The airfoil has a first sidewall and an opposite second sidewall, which are joined together at a leading edge and a trailing edge and extend longitudinally from a root to a tip. The airfoil further comprises an internal cooling flow passage, which extends longitudinally between said first and second sidewalls for channeling a cooling medium to cool the airfoil. The airfoil itself is part of a turbine blade.

In an alternative embodiment the cooled wall is configured as a heat shield in the hot gas path of a gas turbine or as the sidewall of a burner or combustion chamber of a gas turbine.

Additionally the cooled wall may comprise a surface coating on the side of the cooling flow passage. Typically such a surface coating is configured as an anti oxidation coating.

The hot gas path side of the cooled part is typically coated with a thermal barrier coating.

BRIEF DESCRIPTION OF THE DRAWINGS

The disclosure, its nature as well as its advantages, shall be described in more detail below with the aid of the accompanying drawings. Referring to the drawings:

FIG. 1 shows an example of a gas turbine control system, comprising a compressor, a combustor, and a turbine.

FIG. 2 shows a cut of a cooled wall with an ideal conventional turbulator rib for cooling enhancement.

FIG. 3 shows a cut of a cooled wall with a real conventional turbulator rib for cooling enhancement.

FIG. 4 shows a cut of an exemplary embodiment of a turbulator rib with a fillet extending into the cooled wall downstream of the turbulator rib for cooling enhancement.

FIG. 5 shows a cut of an exemplary embodiment of a turbulator rib with a fillet extending into the cooled wall downstream of the turbulator rib and a fillet extending into the cooled wall for cooling enhancement upstream of the turbulator rib.

DETAILED DESCRIPTION

Figure 6:
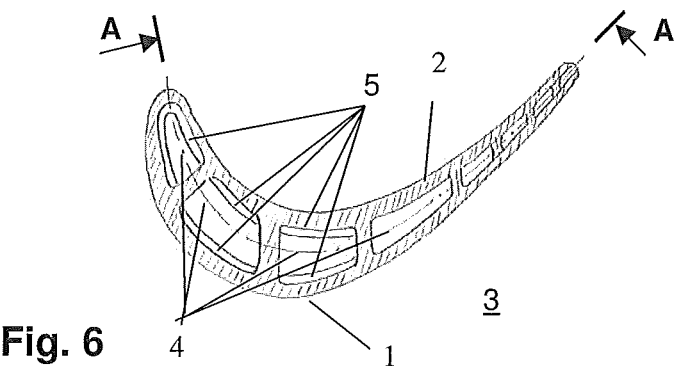
FIG. 6 shows an exemplary cross section of an airfoil with internal cooling ducts and turbulator ribs on the sidewalls.

The same or functionally identical elements are provided with the same designations below. The values and dimensional specifications indicated are only exemplary values and do not constitute any restriction to such dimensions or embodiments.

FIG. 1 shows an example of gas turbine 10. A compressor 8 pressurizes inlet air 6. The compressed air is channeled to a combustor 9, mixed with fuel 12, and ignited for generating combustion gases which flow to a turbine 11 disposed downstream therefrom. The turbine extracts energy from the hot combustion gases for driving the compressor and a generator 13. The heat of exhaust gases 7 is typically further used in a subsequent HRSG (heat recovery steam generator) to generate steam for a water steam cycle of for process heat (not shown). The walls of parts enclosing the flow path of the hot combustion gases, such as for example the burner walls, liners, and heat shields as well as blades exposed to the hot gases in the turbine 11 are typically cooled with a cooling medium such as cooling air or steam. To enhance the heat transfer on the cooling side turbulator ribs can be applied.

FIG. 4 shows a cut of an exemplary embodiment of a turbulator rib 5 with a fillet, which is extending into the cooled wall 1, 2 for cooling enhancement downstream of the turbulator rib 5. The original shape of the cooled wall 1, 2 before applying the fillet is indicated with the dashed line. The fillet with radius R1 is penetrating into the cooled wall with a penetration depth δ thereby at least partly compensating for the negative effect of the rounded tip corners and fillets. Between the base of the fillet, which is extending into the cooled wall 1, 2, to the onset of the subsequent turbulator rib 5 a linear transition is shown in this example, i.e. the radius of the curvature R3 is infinity. Curvatures with a finite radius are also conceivable or a combination of curved and linear sections in a transition can be used.

FIG. 5 shows a cut of a second exemplary embodiment of a turbulator rib 5. In this example a fillet is extending into the cooled wall 1, 2 for cooling enhancement downstream of the turbulator rib 5 and a fillet is extending into the cooled wall 1, 2 for cooling enhancement upstream of the turbulator rib 5. In the shown example both fillets with a radius R1 penetrate to a penetration depth δ into the cooled wall 1, 2. The fillet has the shape of an arc with a central angle Φ, which is greater than 90°. The original shape of the cooled wall 1, 2 before applying the fillet is indicated with the dashed line. From the base of the fillet, which is extending into the cooled wall 1, 2, a transition to the original wall thickness of the cooled wall 1, 2 is shown in this example. The transition includes a linear section followed by a curvature with a finite radius R3.

FIG. 6 shows an exemplary cross section of an airfoil 3. The airfoil 3 has a first sidewall 1 and an opposite second sidewall 2, which are joined together at a leading edge and a trailing edge and extend longitudinally from a root to a tip. The airfoil 1 further comprises internal cooling flow passages 4, which extend longitudinally between said first and second cooled sidewalls 1, 2 for channeling a cooling flow 14 to cool the airfoil 3. The internal cooling flow passages 4 comprise turbulator ribs 5 on the first cooled sidewall 1, and on the second cooled sidewall 2.

Figure 7:
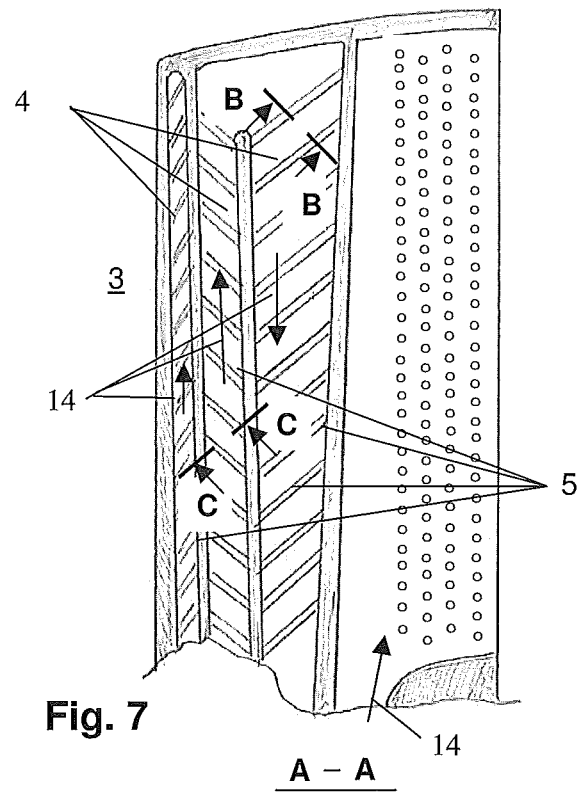
FIG. 7 shows an exemplary arrangement of turbulator ribs on the sidewall of a gas turbine airfoil.

In FIG. 7 (the longitudinal cut A-A of FIG. 6) an exemplary arrangement of turbulator ribs 5 on the cooled sidewall 2 of a gas turbine airfoil 3 is shown. The airfoil 5 includes internal passages, which extend longitudinally between the first cooled sidewall 1 and second cooled sidewall 2 for channeling a cooling medium in a cooling flow passage 4 to cool the airfoil 3. More specifically, cooling air as cooling medium is conventionally channeled from the compressor 8 of the gas turbine 10 (FIG. 1) through blade root and upwardly into the airfoil 3. The cooling flow passages 4 in the exemplary embodiment illustrated include a leading edge passage, which extends from the root upwardly through the airfoil 3 to the tip; a serpentine passage, which extends from the root upwardly through the airfoil 3 to the tip wherein the cooling flow is turned 180° into a return passage and flows longitudinally downwardly. Additionally the shown airfoil comprises a trailing edge passage, which extends to the tip. In this example turbulator ribs 5 are arranged in the first three cooling passages. Examples of different possible cross sections B-B and C-C of the turbulator ribs 5 are shown in FIGS. 2 and 3 for ideal, and real conventional turbulator ribs as well as for exemplary embodiments in FIGS. 4 and 5.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the disclosure is indicated by the appended claims rather than the foregoing description and all changes that come within the meaning and range and equivalence thereof are intended to be embraced therein.

The invention claimed is:

1. A wall of a gas turbine for separating a hot gas flow path from a cooling gas flow path, the wall comprising:
   a surface facing the cooling gas flow path;
   at least one turbulator rib extending from the surface of the wall into the cooling gas flow path;
   wherein each at least one turbulator rib includes a root at a connection of each turbulator rib to the surface of the wall, each root having a fillet arranged on a downstream side of the respective turbulator rib relative to a cooling gas flow direction during operation and a fillet arranged on an upstream side of the respective turbulator rib relative to the cooling gas flow direction during operation;
   each downstream fillet has a radius and forms an indentation in the surface of the wall, wherein each indentation forms a local reduction in thickness of the wall, and wherein a transition surface of the surface of the wall extend linearly from each downstream fillet toward the upstream fillet of an adjacent turbulator rib of the at least one turbulator ribs.

2. The wall according to claim 1, wherein each transition surface has a curved portion distal to the adjacent downstream fillet that is curved with a curvature, which is greater than a curvature of the radius of each downstream fillet.

3. The wall according to claim 1, wherein the entirety of each transition surface is linear.

4. The wall according to claim 1, wherein each downstream fillet has a radius and penetrates into the wall with a penetration depth between 0.5 and 1.5 times each downstream fillet radius.

5. The wall according to claim 1, wherein a penetration depth of each downstream fillet extending into the wall is smaller than each downstream fillet radius.

6. The wall according to claim 1, wherein a penetration depth of each downstream fillet extending into the wall is less than ¼ of the wall thickness.

7. The wall according to claim 1, wherein the at least one turbulator rib has a width and at least two of the at least one turbulator rib are arranged with a pitch therebetween and the width is 5% to 20% of the pitch.

8. The wall according to claim 1, wherein the cooling gas flow path comprises a cooling flow passage and a height of the at least one turbulator rib is between 5% and 20% of a height of the cooling flow passage.

9. The wall according to claim 1, wherein the at least one turbulator rib is an integral part of the wall and/or in that the wall and the at least one turbulator rib is one cast part.

10. The wall according to claim 1, wherein the wall is a sidewall of an airfoil having a first sidewall and an opposite second sidewall joined together at a leading edge and a trailing edge and extending longitudinally from a root to a tip, and the cooling gas flow path comprises an internal cooling flow passage that extends longitudinally between said first and second sidewalls for channeling a cooling medium to cool the airfoil.

11. A heat shield in the hot gas flow path of the gas turbine comprising:
the wall according to claim 1.

12. A sidewall of a burner or a combustion chamber of the gas turbine, comprising:
the wall according to claim 1.

* * * * *